United States Patent [19]

Lill

[11] Patent Number: 4,819,364
[45] Date of Patent: Apr. 11, 1989

[54] PULL APART FISHING WEIGHT

[76] Inventor: Robert J. Lill, 1477 Cardinal La., Chaska, Minn. 55318

[21] Appl. No.: 178,632

[22] Filed: Apr. 7, 1988

[51] Int. Cl.$^4$ ............................................. A01K 85/00
[52] U.S. Cl. .................................................... 43/43.1
[58] Field of Search ................... 43/43.1, 43.12, 17.2, 43/43.14

[56] References Cited

U.S. PATENT DOCUMENTS

| | | | |
|---|---|---|---|
| 1,564,147 | 12/1925 | Stickley et al. | 43/43.12 |
| 2,271,899 | 2/1942 | Miller | 43/28 |
| 2,326,876 | 8/1943 | Miller | 43/52 |
| 2,713,743 | 7/1955 | Stark | 43/43.12 |
| 3,006,103 | 10/1961 | Scott | 43/42.06 |
| 3,648,398 | 3/1972 | Newell | 43/43.12 |
| 3,740,803 | 6/1973 | Arteburn | 43/43.12 |
| 4,125,958 | 11/1978 | Cote | 43/43.12 |
| 4,361,977 | 12/1982 | Lawler | 43/43.1 |
| 4,467,550 | 8/1984 | Haulk | 43/43.12 |

*Primary Examiner*—M. Jordan
*Attorney, Agent, or Firm*—Moore & Hansen

[57] ABSTRACT

A pull-apart fishing weight with a separable head made of an elastomer resin and a weight member made of lead. The separable head contains two pins which are inserted in a friction fit into two aligned apertures in the weight member. When the pull-apart fishing weight becomes entangled in an underwater obstruction, force may be applied to the separable head through the fishing line allowing the separable head to detach from the weight member and thereby preventing the line from snapping and the resulting loss of fishing tackle.

10 Claims, 1 Drawing Sheet

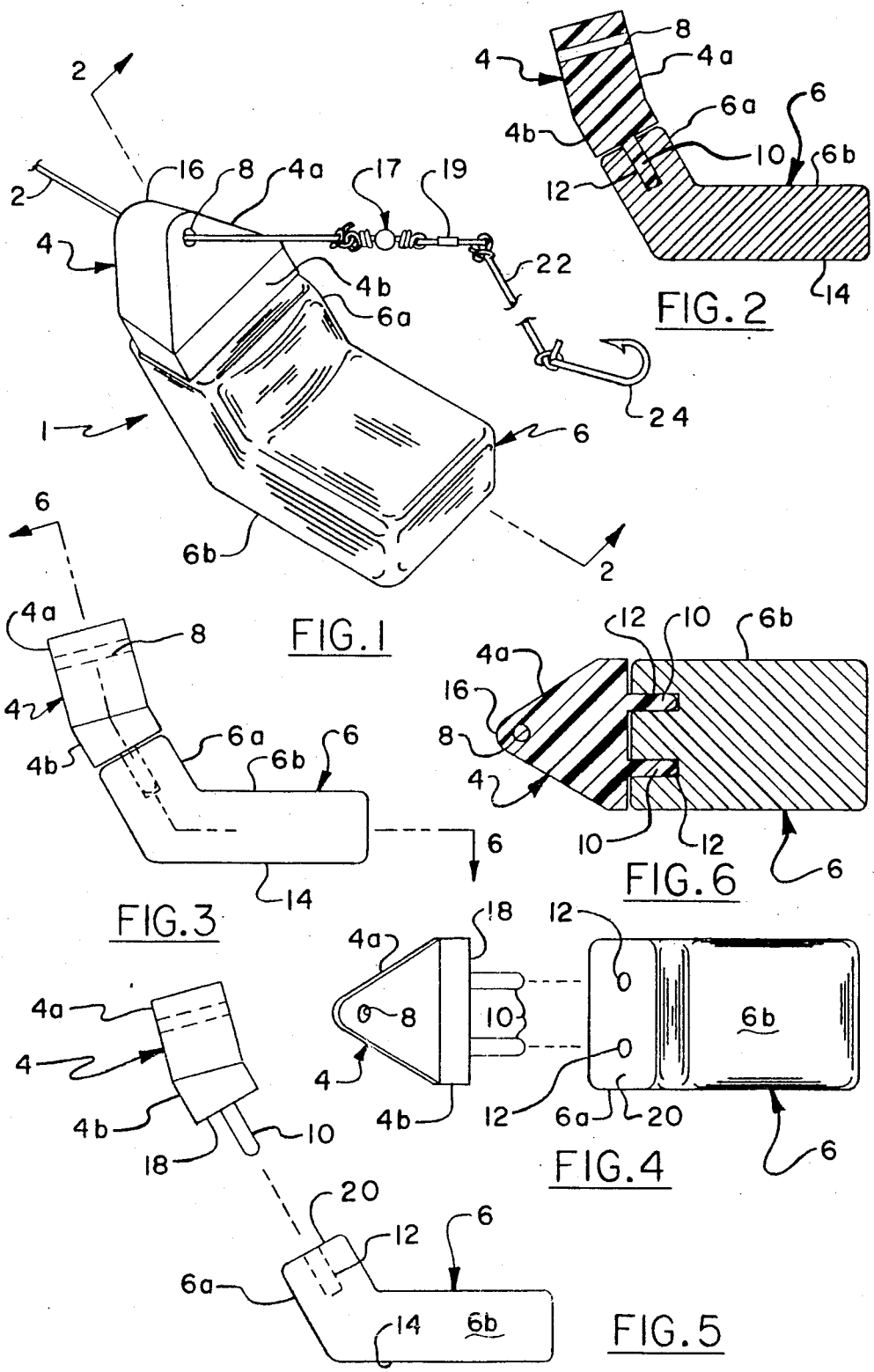

PULL APART FISHING WEIGHT

BACKGROUND OF THE INVENTION

This invention relates to fishing weights of the type that are detachable from the fishing line should the weight become entangled in some inaccessible obstruction beneath the surface of the body of water being fished. Various types of detachable fishing weights already exist, usually involving relatively complex or cumbersome means for attaching the detachable portion of the fishing weight to the fishing line.

It is a common problem for fishermen trying to catch fish near the bottom of a body of water that their fishing line may become entangled with an underwater obstruction such as submerged rocks or tree limbs.

With a common, non-detachable fishing weight, the fisherman often will tug at the line in an effort to dislodge the weight and break the line. He thus loses not only the weight but also the remainder of his tackle, including the snap and swivel, leader, and lure or bait. These items are far more valuable, expensive, and annoying to replace than a fishing weight.

That part of the fishing line most likely to resist the fisherman's efforts to free the line is the fishing weight, since it is bulky and, being heavy, usually lies at or near the bottom of the body of water. Lure and weight arrangements commonly referred to as the "Lindy-rig" are especially vulnerable to this problem, since on a "Lindy-rig" the weight is attached to a short connecting line near the end of the main fishing line, at the end of which is fastened the bait or lure.

However, not only the "Lindy-rig" arrangement is vulnerable. A weight may also be fastened to the fishing line above the snap and swivel. While many detachable weight assemblies are not designed for this type of use, weights in this configuration may still cause a line to become entangled with underwater obstructions, resulting in a similar loss of tackle.

Furthermore, changing weights for varying fishing conditions or strategies may be a cumbersome and annoying process with both conventional weights and prior designs of detachable weights. This is because fisherman may be required to untie and retie knots with wet, slippery fishing line, or to manipulate various cold, sharp wire holders or metal snaps.

A pull-apart fishing weight with an improved attachment/detachment means has been developed to overcome these problems.

BRIEF SUMMARY OF THE INVENTION

The pull-apart fishing weight of this invention is particularly distinguishable by the friction-fit arrangement between its separable head and its main body.

It is common among many pull-apart fishing weights to have some form of adapter built into that portion of the assembly which is fixed to the fishing line or an attachment to the fishing line. However, what is unique about the present invention is the use of a single separable head portion which includes, in the preferred embodiment, two pins for friction fitting into aligned receptacles, or apertures, in the main body, or weight member. The separable head portion is manufactured in its preferred embodiment of a thermoplastic elastomer composite of a base resin copolymer blended or alloyed with specialty polymers, copolymers and elastomers. An elastomer molding material maufactured by General Electric Company under the trade name "LOMOD" has proven to be particularly effective. When molded to the desired shape, this material provides a particularly firm friction fit for retention of the pins in the receptacles of the weight member, while at the same time not being so hard as to wear away the sides of the apertures in the weight member, which is made of lead in the preferred embodiment, and is therefore quite soft and subject to erosion.

The weight member of the weight assembly is generally boot-shaped; i.e., it is generally flat and rectangular in configuration, with one end being offset from the plane of the rectangular base at a relatively small angle. This is the end which contains the receiving apertures for mating with the pins of the separable head.

The weight member may also be somewhat wider than the separable head so as to facilitate and assure proper detachment of the head. Further, the weight member may be manufactured to the different weights commonly used by fisherman by simply varying the thickness, and the length as necessary, of the weight member. Different size weights can be interchangeably used by simply unplugging the separable head and inserting its protruding pins into a different size weight member having pin receiving apertures of a predetermined length and diameter.

These and other objects and advantages of the invention will be readily understood as the following description is read in conjunction with the accompanying drawings, wherein like reference numerals have been used to designate like elements throughout the several views.

BRIEF DESCRIPTION OF THE DRAWINGS

FIG. 1 is a perspective view of the pull-apart fishing weight showing it attached to a fishing line;

FIG. 2 is a side section view through the separable head and weight member taken along line 2—2 of FIG. 1;

FIG. 3 is a side elevation view of the pull-apart fishing weight in assembled form;

FIG. 4 is a top plan view with the separable head removed from the weight member, showing the two pin arrangement of the preferred embodiment;

FIG. 5 is a side elevational view with the separable head removed from the weight member, as in FIG. 4, with broken lines showing the location and depth of an aperture in the weight member; and FIG. 6 is a section view of the assembled separable head and weight member taken along lines 6—6 of FIG. 3.

DESCRIPTION OF THE PREFERRED EMBODIMENT

With reference to the drawings, and in particular to FIGS. 1-3, the improved pull-apart fishing weight is generally indicated by reference numeral 1. The weight is comprised of a separable head 4 and a weight member or main weight body 6. Head 4 has a generally triangular shaped outer portion 4a and a rectangular base 4b, which is recessed or indented slightly inwardly from the bottom end of outer portion 4a. As shown, pull-apart fishing weight 1 is attached to fishing line 2 by passing fishing line 2 through integral line attachment means in the form of aperture 8, located in the outer end 4a of separable head 4 generally opposite from the weight member 6.

The weight member 6 is generally boot-shaped, or of a generally rectangular shape of uniform thickness, with the end 6a offset somewhat from the base end 6b at a relatively slight angle so as to provide a bottom surface 14 which allows the pull-apart fishing weight 1 to be more easily maneuvered along the bottom of a body of water. In the preferred embodiment the weight member 6 would be made of lead. The preferred embodiment of the weight member 6 contains two cylindrical, parallel apertures 12 which are drilled or otherwise formed into the end 6a for receiving straight pin members 10 of the separable head 4, as hereinafter described.

The separable head 4 is generally flat with generally triangular outer portion 4a located on the side opposite the weight member 6. Outer portion 4a is rounded at its top end 16 to facilitate passage over obstacles. Included in the portion 4a of the separable head 4 is an integral line attachment means 8 which consists of a hole through which a fishing line 2 or some other attaching mechanism may pass. Intermediate between the outer head portion 4a and the weight member 6 is base portion 4b, which is rectangular and slightly less thick and less wide than the triangular portion 4a. The tapered or triangular shape of the separable head outer end 4a, together with the indented base 4b, helps insure proper operation of the pull-apart fishing weight 1 by increasing the probability that the head 4 will clear obstacles and that the actual portion of the assembly caught up in a submerged entanglement is the weight member 6.

Finally, attached to the base 4b of the separable head 4 on the side opposite the outer end 4a are two straight pin members 10. Elongated pins 10 depend from the flat face 18 of head 4 as shown in FIG. 4, and are preferably molded integrally therewith. These pin members are generally cylindrical, of a predetermined diameter, and are adapted for friction fitting within the aligned apertures 12 of the weight member 6. Weight member angled end 6a has a flat face 20 as best shown in FIGS. 4 and 5. Thus, when pin members 10 are inserted within apertures 12, and head 4 and weight member 6 are assembled together, flat face 18 of head base 4b will abut flush against flat face 20 of angled end 6a of weight member 6. The separable head 4 is preferably injection molded from a thermoplastic resin elastomer comprising a composition of a copolymer base resin blended with a special polymer or copolymer resin. The blending alloy resin may be butyleneterephthalate (PBT). A commercially available engineering elastomer made by General Electric and marketed under the trademark "LOMOD" has been found to be particularly effective as the molding material for head 4 and its retention pins 12. This material is preferred above others that were tested because it displays high friction properties which makes for a firm friction fit of pins 10 within apertures 12, and at the same time is not so hard that it promotes erosion of the inside lead walls of the aligned apertures 12. Such erosion would enlarge the holes 12 and allow the separable head 4 to slip out of the weight when weight member 6 encounters any slight resistance. The rubber-like, elastomer material of pins 10 enhances friction retention within apertures 12.

In use weight 1 will be secured on a fishing line in any desired manner. As shown in FIG. 1, this may be done by simply threading the fishing line or leader through aperture 2 in separable head 4. With the line tied to a swivel 17 attached to a snap 19 below the weight 1, the weight will not be able to slide off the line. A hook 24 or artificial lure may be attached to snap 19, as by an intermediate length of leader or line 22. The length of leader or line 22 would preferably be such as to insure that the hook or lure will be carried above the bottom of a lake or river, if weight 1 is being dragged along the bottom. The flat bottom surface 14 of weight member 6 will slide along the bottom or over rocks and other obstacles to assist in avoiding a snag. The use of a molded plastic head 4, of tapered shape as shown, greatly enhances the ability of the weight assembly to pass over and across rocks, submerged brush, etc. without becoming snagged, as so often occurs with ordinary lead weights. However, if the weight 1 does become caught on an underwater obstruction, the resistance on the lure will cause pins 10 to pull out of apertures 12 in weight member 6. Thus only weight member 6 will be lost, and a replacement weight member 6 can readily be attached to the line by simply forcing or plugging pins 10 of head 4 into the new weight member. Head 4 will still be on the line. The material and diameter of pins 10 is selected so as to provide just the desired degree of resistance to separation out of apertures 12 in weight member 6.

The ease with which weight members can be attached to outer head 4 by pins 10 also is very useful in changing weights, as desired, to adjust for different water depths, wind conditions, and type of lure or bait being used. A selection of members 6 of different, standard fishing weights is provided, with each having the same diameter and length of apertures 12 to receive pins 10 in the desired friction it.

It is anticipated that various changes may be made in the size, shape, and construction of the approved pull-apart fishing weight disclosed herein without departing from the spirit and scope of the invention as defined by the following claims.

What is claimed is:

1. A pull-apart fishing weight, comprising:
   a weight member;
   a separable head member with integral line attachment means having at least one pin member depending therefrom and received in a friction fit in a corresponding aligned aperture in said weight member, whereby said pin member is retained in said weight member and said head member and said weight member are detachably assembled together under normal fishing conditions, and said pin member is slidably detachable from said aligned aperture when a predetermined resistance force is applied to said weight member, thereby allowing said separable head member to detach from said weight member as when said weight member becomes caught on an underwater obstruction;
   said separable head member has a generally rectangular base with an elongated face, and said pin member depends from said elongated face of said rectangular base; and
   said weight member has an elongated face on the end thereof adjacent to said head member, and said aperture is formed within said adjacent end of said weight member in alignment with said pin member, whereby said elongated face of said base of said head member and said face of said weight member are in confronting relation when said pin member is inserted into said aperture and said weight member and said head member are assembled together.

2. A fishing weight as defined in claim 1 wherein:
   said weight member is of a generally flat, rectangular configuration, and is comprised of an elongated base end and an angled end adjacent to said head member which is angularly offset from the plane of the rectangular base end, and said aperture being formed in said angled end in alignment with said pin member.

3. A fishing weight as defined in claim 1 wherein: two pin members depend from said head member and said weight member has two elongated apertures therein within which said pin members are received and retained in a friction fit.

4. A fishing weight as defined in claim 1 wherein: said separable head member is comprised of a molded elastomer resin.

5. A pull-apart fishing weight, comprising:

a weight member;

a separable head member with integral line attachment means having at least one pin member depending therefrom and received in a friction fit in a corresponding aligned aperture in said weight member, whereby said pin member is retained in said weight member and said head member and said weight member are detachably assembled together under normal fishing conditons, and said pin member is slidably detachable from said aligned aperture when a predetermined resistance force is applied to said weight member, thereby allowing said separable head member to detach from said weight member as when said weight member becomes caught on an underwater obstruction;

said separable head member has a generally triangular shaped outer end and a generally rectangular base with a flat face, and said pin member depends from said flat face of said rectangular base; and said weight member has a flat face on the end thereof adjacent to said head member, and said aperture is formed within said adjacent end of said weight member in alignment with said pin member, whereby said flat face of said base of said head member abuts against said flat face of said weight member when said pin member is inserted into said aperture and said weight member and said head member are assembled together.

6. A fishing weight as defined in claim 5 wherein: two pin members depend from said head member and said weight member has two elongated apertures therein within which said pin members are received and retained in a friction fit.

7. A pull-apart fishing weight, comprising:

a weight member;

a separable head member with integral line attachment means having at least one pin member depending therefrom and received in a friction fit in a corresponding aligned aperture in said weight member, whereby said pin member is retained in said weight member and said head member and said weight member are detachably assembled together under normal fishing conditions, and said pin member is slidably detachable from said aligned aperture when a predetermined resistance force is applied to said weight member, thereby allowing said separable head member to detach from said weight member as when said weight member becomes caught on an underwater obstructon;

said separable head member is comprised of a molded elastomer resin; and said pin member depending from said separable head member is molded integrally with said head member of the same elastomer resin to thereby provide said pin member with a desired friction property.

8. A fishing weight as defined in claim 7 wherein: said weight member is made of lead and said molded elastomer pin member is of a predetermined diameter and is received in said aperture of said weight member in a firm friction fit therewith.

9. A fishing weight as defined in claim 7 wherein: said elastomer resin is LOMOD as manufactured for commercial use by General Electric Company.

10. A fishing weight as defined in claim 7 wherein: said weight member is of a preselected weight for particular fishing conditions and requirements, whereby weight members of different standard fishing weights having the same size aperture formed therein to receive said pin member in a friction fit therewith may be utilized with the same separable head member thereby allowing changing of said weight members without removing said separable head member from a fishing line.

* * * * *